(12) United States Patent
Kalandek

(10) Patent No.: US 7,278,656 B1
(45) Date of Patent: Oct. 9, 2007

(54) SEAT MOUNTED SIDE IMPACT AIRBAG MODULE

(75) Inventor: Bruce Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/668,775

(22) Filed: Jan. 30, 2007

(51) Int. Cl.
*B60R 21/26* (2006.01)

(52) U.S. Cl. .................. 280/730.2; 280/729; 280/736; 280/742

(58) Field of Classification Search ............. 280/730.1, 280/730.2, 736, 742, 728.2, 729
See application file for complete search history.

(56) References Cited

U.S. PATENT DOCUMENTS

| | | | |
|---|---|---|---|
| 5,468,013 A | 11/1995 | Gille | |
| 5,505,485 A | 4/1996 | Breed | |
| 5,586,782 A * | 12/1996 | Zimmerman, II et al. | 280/730.2 |
| 5,593,180 A | 1/1997 | Cuevas et al. | |
| 5,738,371 A | 4/1998 | Blackshire et al. | |
| 5,779,263 A | 7/1998 | Lane, Jr. et al. | |
| 5,791,685 A * | 8/1998 | Lachat et al. | 280/743.1 |
| 5,803,485 A | 9/1998 | Acker et al. | |
| 5,853,191 A * | 12/1998 | Lachat | 280/730.2 |
| 5,890,732 A * | 4/1999 | Nakamura et al. | 280/729 |
| 5,895,070 A * | 4/1999 | Lachat | 280/730.2 |
| 5,899,494 A | 5/1999 | Lane, Jr. | |
| 6,213,500 B1 * | 4/2001 | Jost et al. | 280/730.2 |
| 6,349,964 B1 * | 2/2002 | Acker et al. | 280/730.2 |
| 6,364,348 B1 * | 4/2002 | Jang et al. | 280/730.2 |
| 6,478,329 B1 * | 11/2002 | Yokoyama | 280/729 |
| 6,648,368 B2 | 11/2003 | Smith et al. | |
| 7,021,652 B2 * | 4/2006 | Kumagai et al. | 280/729 |
| 7,063,350 B2 * | 6/2006 | Steimke et al. | 280/729 |

(Continued)

FOREIGN PATENT DOCUMENTS

EP  0 999 101 A1  9/1996

(Continued)

*Primary Examiner*—Paul N. Dickson
*Assistant Examiner*—Toan C. To
(74) *Attorney, Agent, or Firm*—Lonnie Drayer

(57) ABSTRACT

A seat mounted side impact airbag module for protecting an occupant of a vehicle has an airbag with a first inflation chamber for engaging the pelvic region of the vehicle occupant and a second inflation chamber for engaging the thoracic region of the vehicle occupant. The inflation chambers are separated by a chamber separator. An inflator provides inflation gas to fill the airbag housed in a tubular housing manifold having a first aperture and a second aperture. The housing manifold is shaped to retain the inflator and create two discrete flows of inflation gas. A first flow of inflation gas goes into the first inflation chamber via the first aperture and a second flow of inflation gas goes into the second inflation chamber via the second aperture. The chamber separator is tightly sealed around the housing manifold to prevent the first flow and second flow to pass into the other inflation chamber. The chamber separator may be rubber coated with the housing manifold having a recess adapted to accept and hold the chamber separator sealed in a gas tight manner around the exterior of the housing manifold.

18 Claims, 7 Drawing Sheets

U.S. PATENT DOCUMENTS

| | | |
|---|---|---|
| 7,152,876 B2 * | 12/2006 | Hofmann ................. 280/743.1 |
| 2003/0184060 A1 | 10/2003 | Smith et al. |
| 2005/0062266 A1 | 3/2005 | Steimke et al. |
| 2005/0184493 A1 | 8/2005 | Hofmann et al. |
| 2005/0189742 A1 | 9/2005 | Kumagai et al. |
| 2006/0103120 A1 * | 5/2006 | Kurimoto et al. ........ 280/730.2 |

FOREIGN PATENT DOCUMENTS

| | | |
|---|---|---|
| JP | 2000-289556 A | 10/2000 |
| JP | 2000-296751 A | 10/2000 |
| JP | 2005-186655 A | 7/2005 |
| JP | 2005-238890 A | 9/2005 |

* cited by examiner

SEAT MOUNTED SIDE IMPACT AIRBAG MODULE

FIELD OF THE INVENTION

This invention relates generally to side impact airbag modules. More specifically this invention relates to a side impact airbag module with a dual chambered airbag.

BACKGROUND OF THE INVENTION

Vehicles are currently being manufactured with airbag devices. Typically airbags have been provided in the steering wheel and the instrument panel for frontal protection in a crash. Additionally side curtain airbags are provided that can assist in a crash or side impact. Side curtain airbags generally deploy from the top of the vehicle and cover the window areas to provide some head and upper body protection. Other airbags may be provided such as knee bolsters and the like to protect various parts of a vehicle occupant's body during a crash. Another type of airbag is included in a seat mounted side airbag module that provides protection for a vehicle occupant in a side impact.

While all airbag systems provide protection there have been challenges with each type of airbag system that have resulted in numerous innovative solutions. A particular challenge for seat mounted side impact airbags is that the airbag when inflated is either too soft or too rigid. It has been determined that to provide the proper protection for the lower portion of the vehicle occupant's body in the pelvic region requires a stiffer airbag while the upper region of the airbag that encounters the thoracic region of the vehicle occupant needs to be a softer. Several solutions have been proposed to meet this challenge. EP 999101 A1 and in U.S. Pat. No. 5,803,485 A provide a single inflator that inflates two separate airbags. These separate airbags can be inflated such that both the upper thoracic region and the lower pelvic region of a vehicle occupant are adequately protected. US 2005/0062266 A discloses an alternative having one airbag with a separate pelvic engaging inflation chamber and a separate thoracic engaging inflation chamber employed where the gas flow rates are tunable to provide variation within the inflation chambers.

While these solutions provide protection for a vehicle occupant, it has been determined that such systems increase certain levels of complexity with regards to the inflation chambers. Obviously a tuned, two separate airbag system provides the ability to isolate the two bags and provide separate filling upon inflation, however, it was preferred that a single airbag accomplish this task. US 2005/0062266 A tries to achieve this, however, there is no complete isolation of the two inflation chambers such that the gas flow cannot be mixed. As such the bleed through of gasses from one inflation chamber to the other creates a variable in the ability to tune the airbags. While differences in inflation pressures can be achieved using such a device an improvement is needed.

SUMMARY OF THE INVENTION

A seat mounted side impact airbag module for protecting an occupant of a vehicle from impact has an airbag with a first inflation chamber for engaging the pelvic region of a vehicle occupant and a second inflation chamber for engaging the thoracic region of a vehicle occupant, the inflation chambers being separated by a chamber separator. An inflator that produces inflation gas upon actuation to fill the airbag is housed in a tubular housing manifold having a first aperture and a second aperture wherein the manifold housing is shaped to retain the inflator and create two discrete flows of inflation gas. A first flow of inflation gas goes into the first inflation chamber via the first aperture and a second flow of inflation gas goes into the second inflation chamber via the second aperture wherein the chamber separator is tightly sealed around the manifold to prevent the first flow and second flow to pass into the other inflation chamber. In the preferred embodiment the chamber separator is rubber coated and the manifold housing has a recess adapted to accept and hold the chamber separator sealed in a gas tight manner around the exterior of the manifold.

DETAILED DESCRIPTION OF THE INVENTION

Figure 1:
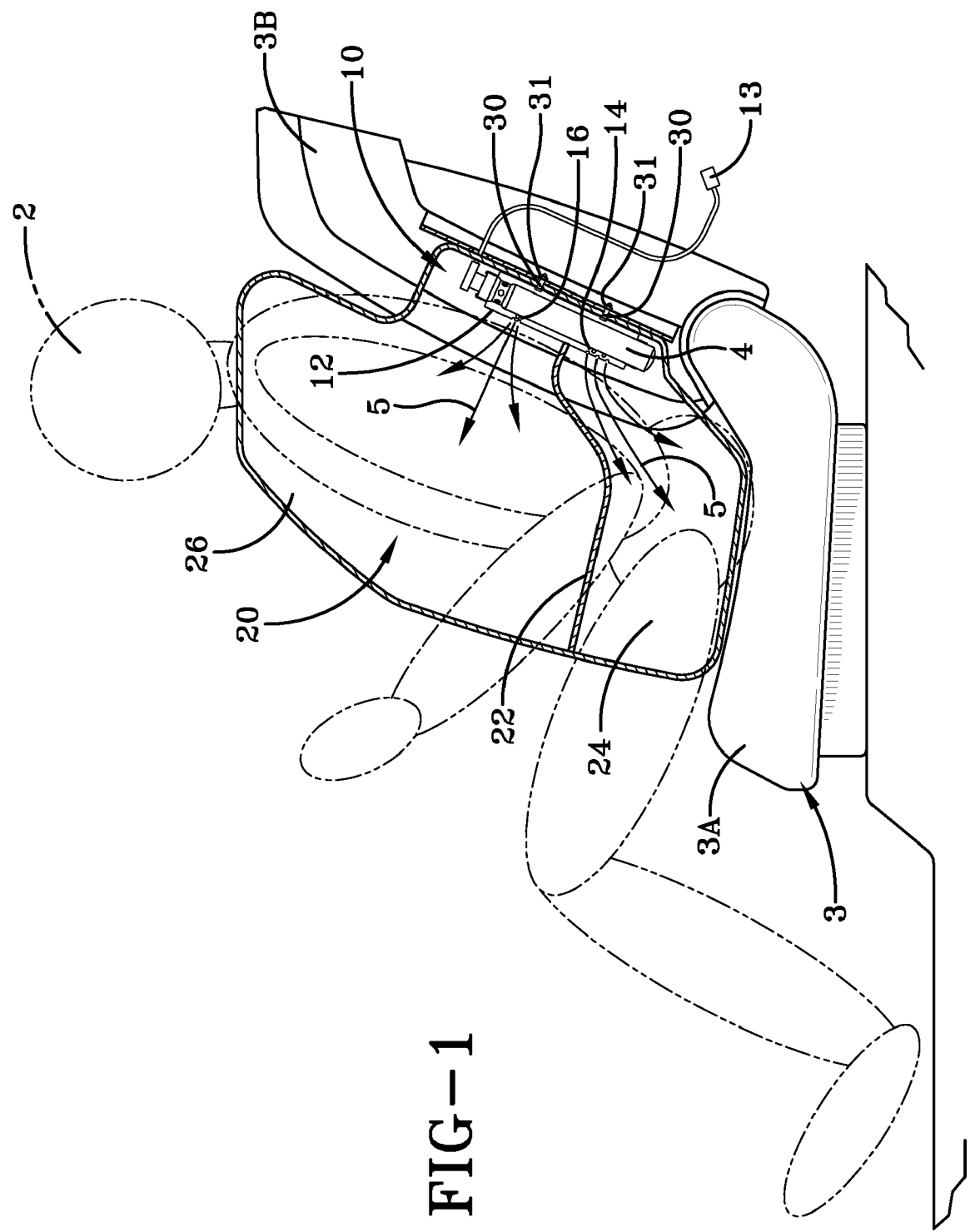
FIG. 1 is a plan view of the side impact airbag module in a fully deployed condition showing an occupant in the seat.

In FIG. 1 a side airbag impact module 10 is shown with the airbag 20 fully deployed. During a side impact the inflator 4 will actuate upon a signal received through the electrical harness 13 and gasses 5 will be released inside a tubular housing manifold 12. While the housing manifold 12 is shown as being tubular it may have any shape, such as oval or elliptical in cross section, that meets the other criteria for the housing manifold set forth herein. The housing manifold 12 has at least one aperture 14, 16 disposed therein near each end of the housing manifold. The apertures 14, 16 are directed towards the direction that the airbag 20 will be deployed. The apertures in the housing manifold 14, 16 are located and sized such that the flow of inflation gas through at least one aperture 14 into a first inflation chamber 24 that is located in the lower half of the airbag 20 for engaging the pelvic region of a vehicle occupant is greater than the flow of inflation gas through at least one aperture 16 into a second inflation chamber 26 for engaging the thoracic region of a vehicle occupant. The inflation chambers 24, 26 are divided by a chamber separator 22 that is sealed in a gas tight manner about a recess 15 in the housing manifold 12 that is better shown in FIGS. 4A and 4B.

Figure 2:
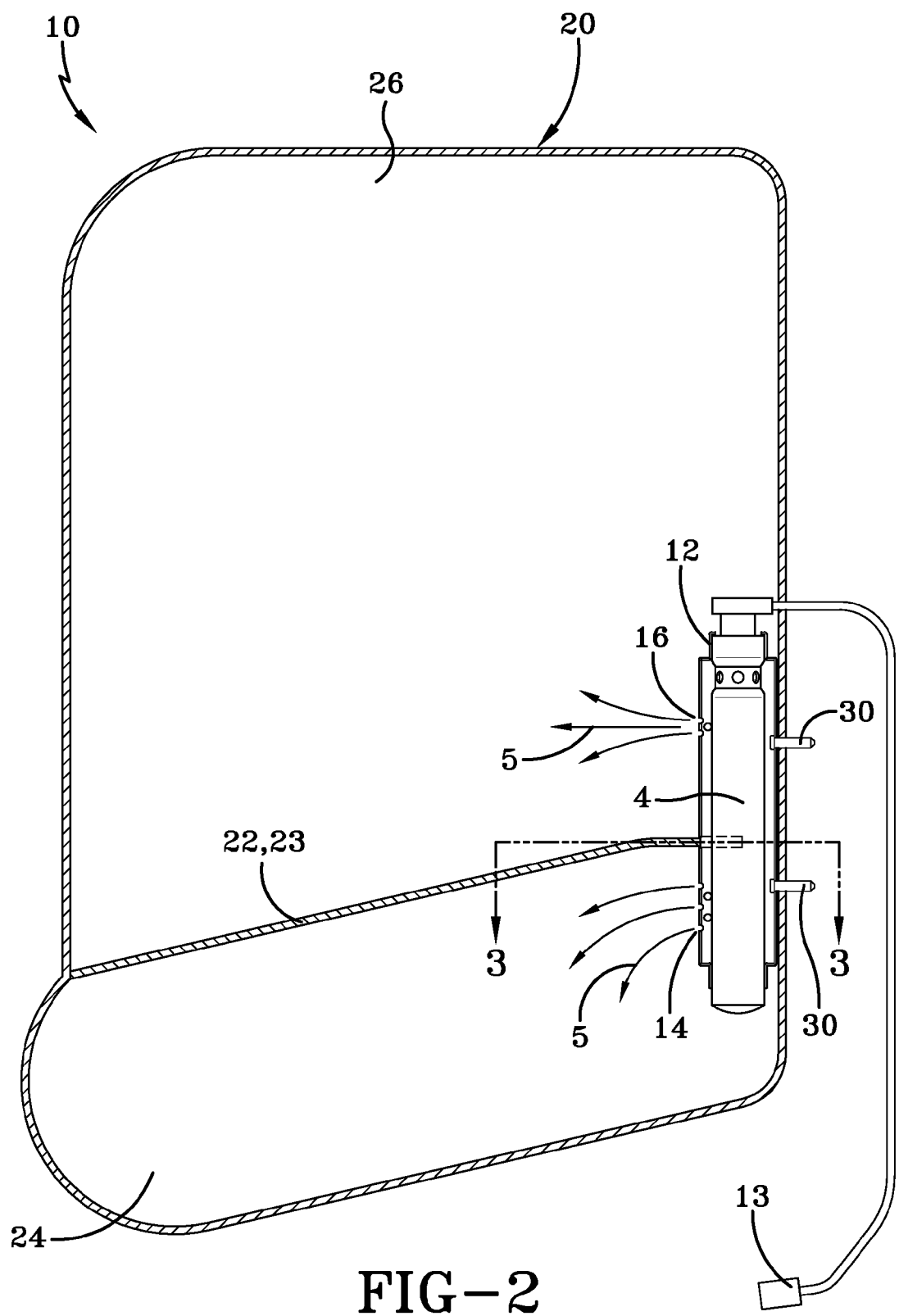
FIG. 2 is a cross sectional view of the airbag module in a deployed condition.
Figure 3:
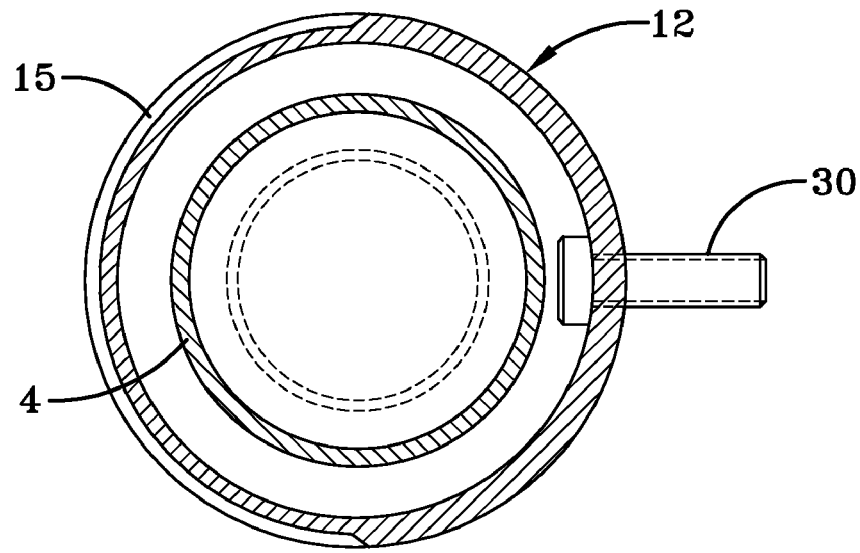
FIG. 3 is a cross sectional view of the housing manifold and inflator taken along line 3-3 of FIG. 2.
Figure 3A:
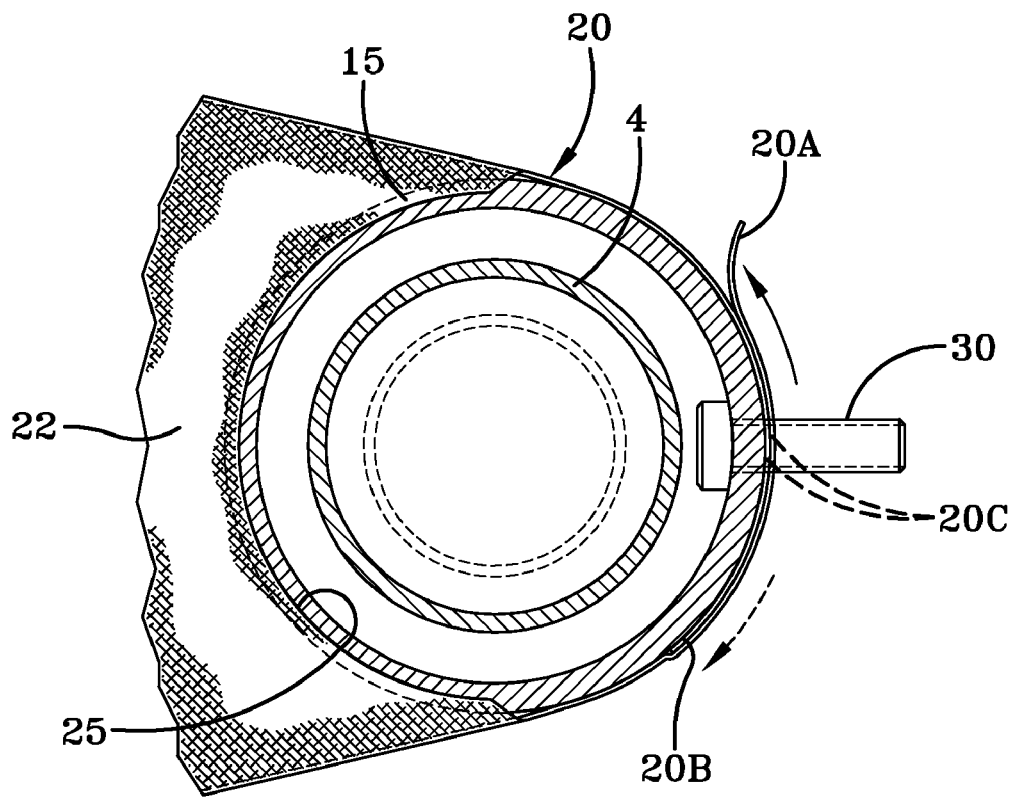
FIG. 3A is a cross sectional view of the airbag module showing the chamber separator attached to the manifold housing and how the airbag flaps at the opening seal the separator against the housing manifold recess.
Figures 4A, 4B:
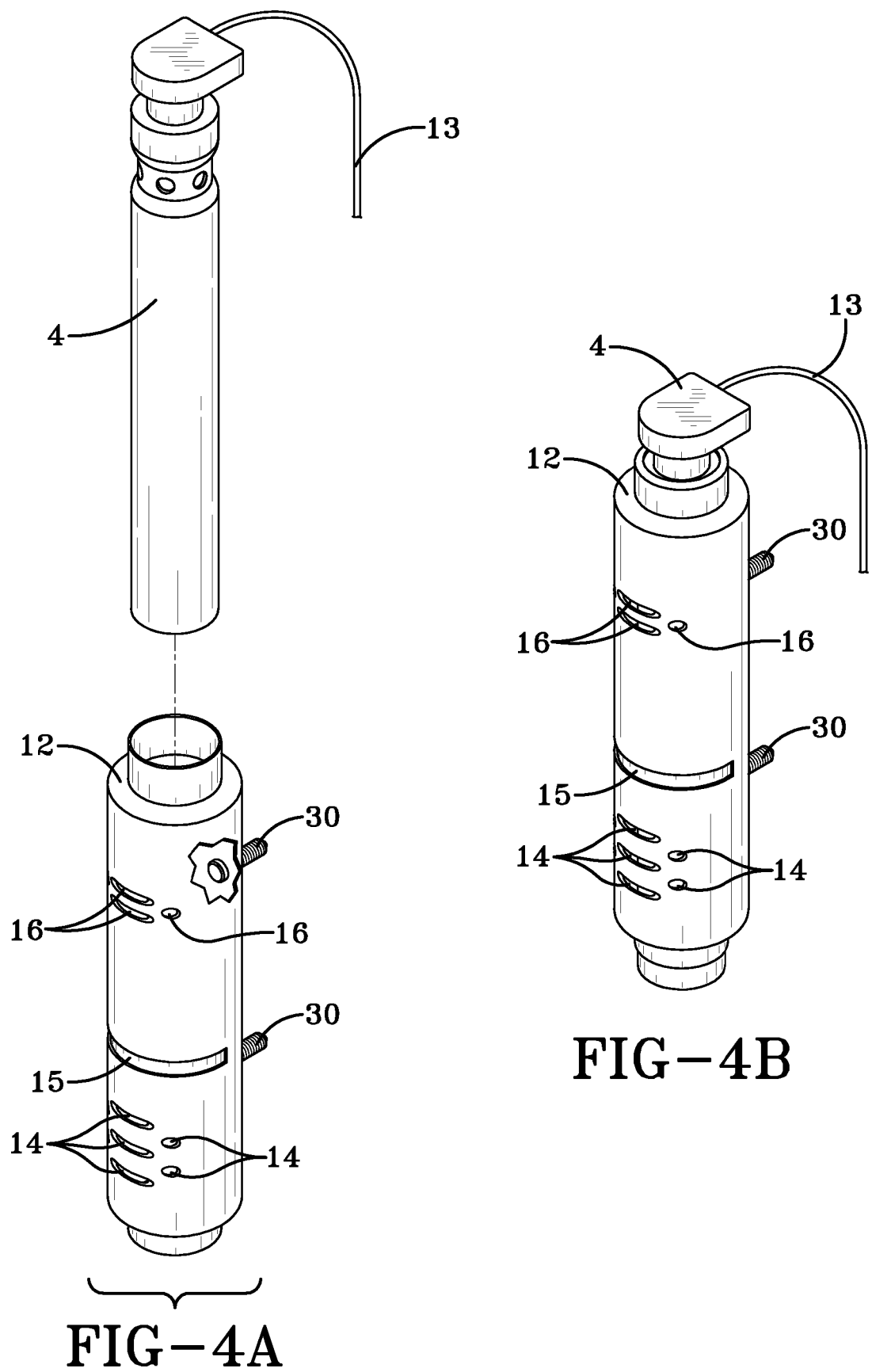
FIG. 4A is a perspective view of the side impact airbag module housing manifold and inflator prior to assembly.
FIG. 4B is a perspective view of the inflator and housing manifold assembly.

In a crash the first inflation chamber 24, shown as the lower part of the airbag 20 in FIG. 1, fills rapidly with a higher inflation pressure than the second inflation chamber 26. The lower first inflation chamber 24 pushes against the vehicle occupant 2 shown seated in seat 3 to ensure the vehicle occupant 2 is positioned away from the impacted door or side of the vehicle to provide extra protection from a side impact. As the legs and hip area of the vehicle occupant 2 resting on the lower seat portion 3A are able to withstand a greater force from the airbag 20, it is desirable to have a much higher force in the lower first inflation chamber 24 than in the upper second inflation chamber 26. It is desirable to soften the impact with the thoracic region of the vehicle occupant by the upper second inflation chamber 26 by forming a plurality of apertures 16 in the housing manifold facing aligned with the second inflation chamber 26 in the direction that the second inflation chamber will deploy. The apertures 16 aligned with the second inflation chamber are smaller in size or number having cross sectional areas substantially less than the apertures 14 in the housing manifold aligned with the lower first inflation chamber 24 as best illustrated in FIGS. 4A and 4B. As a result a single inflator 4 can be used that will provide a softer opening of the upper second inflation chamber 26 when compared to the lower first inflation chamber 24. As shown in FIGS. 1 and 2 the upper second inflation chamber 26 is substantially larger in volume than the lower first inflation chamber 24, this also provides a slower fill rate when the airbag is being deployed, all creating a softer impact on the vehicle occupant 2. The ability to provide different proportions or volumes within the inflation chambers and different airflow constrictions about a housing manifold sealed to provide two discrete flow paths provide a unique way to tune the side airbag module 10 such that the desired performance can be achieved in all situations. Therefore this airbag module provides a unique way to tune the airbag forces in each of the inflation chambers 24, 26.

In FIG. 2 the airbag module 10 is shown in cross section. The chamber separator 22 is made of a material similar to the fabric comprising the airbag 20, however it is gas impermeable. For example the fabric may be heavily rubber coated with a silicone rubber 23. The silicone rubber 23 provides elasticity and gas impermeability to the chamber separator 22. It is important that the airflow and gas filling volumes do not intermix between the two inflation chambers 24, 26. This is desirable if one intends to keep the pressures different between the two inflation chambers.

Figure 5A:
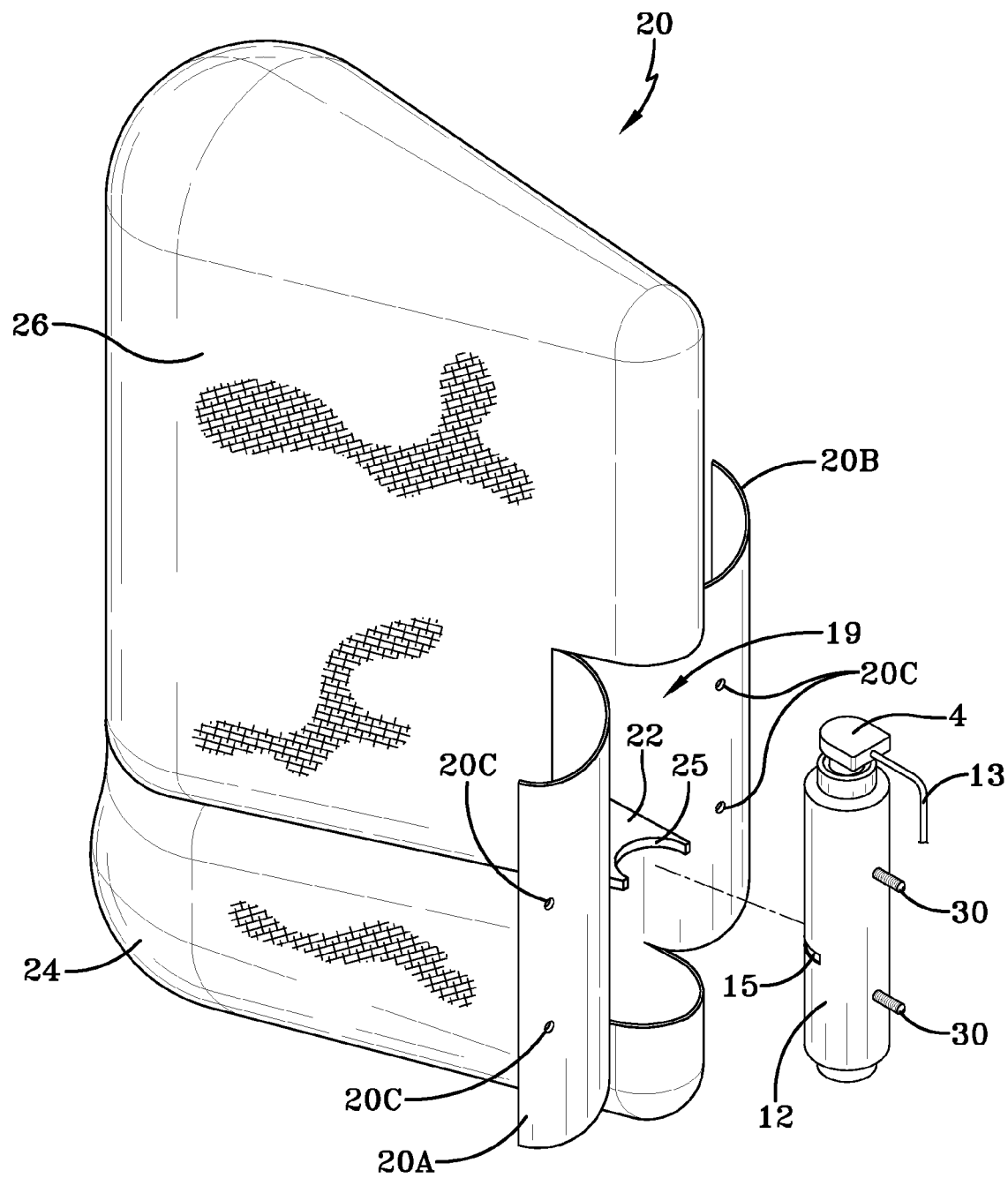
FIG. 5A is a perspective view of the airbag and inflator inside the housing manifold prior to assembly.
Figure 5B:
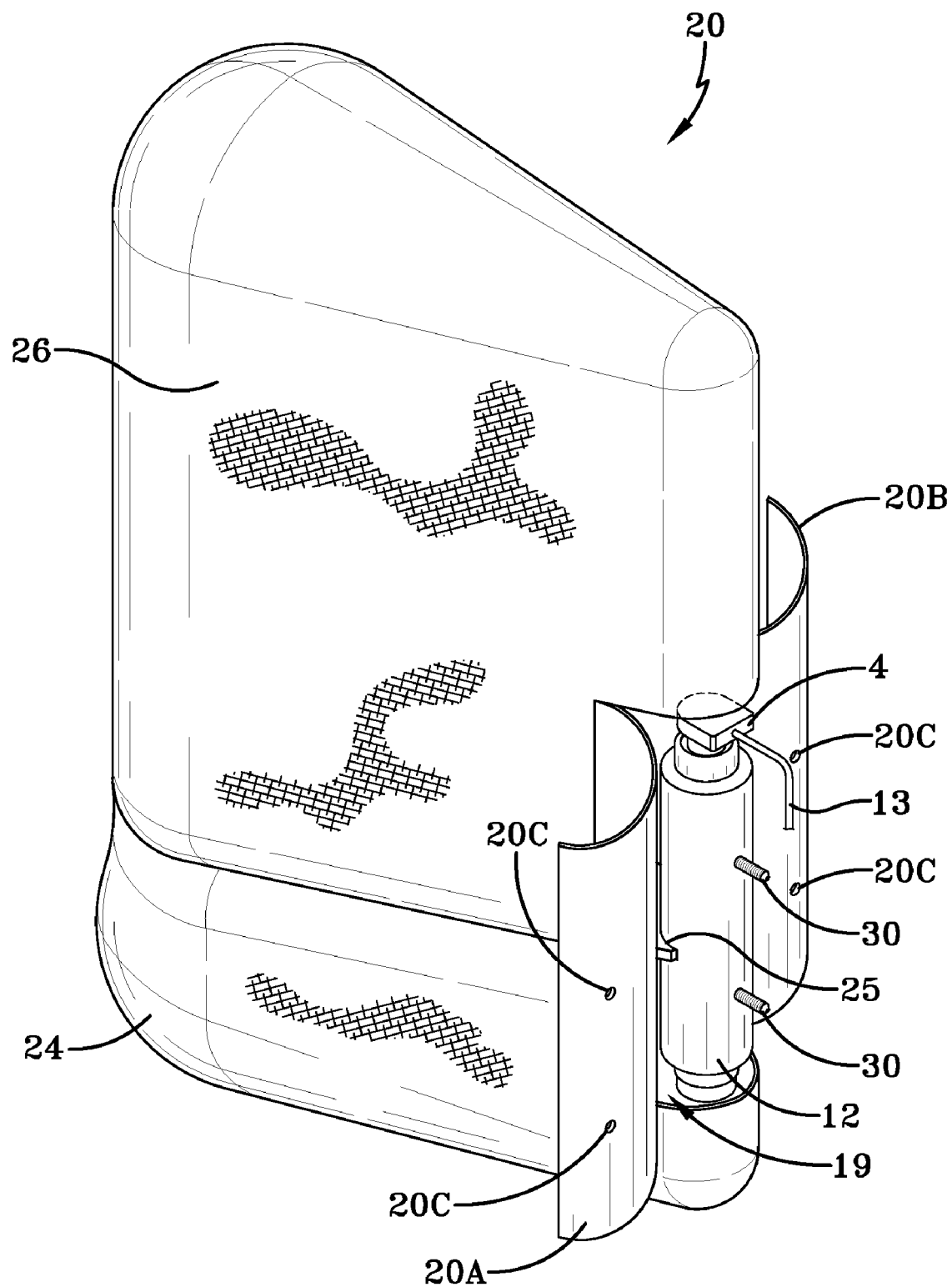
FIG. 5B shows the inflator and housing manifold being positioned in the airbag wherein the separator is located in the recess.

With reference to FIGS. 3, 3A, 4A and 4B the housing manifold 12 is shown with a recess 15 formed as a depression or groove in the tubular housing manifold 12. A half of an ellipsoidal cut out portion in the chamber separator 22 forms an opening slot 25 which can be fit into the recess 15 of the housing manifold 12 along an exterior surface and pulled into the position where the recess 15 in the housing manifold occurs. The recess 15 in the housing manifold accepts the slot 25 in the chamber separator in a gas tight manner. In other words the opening of the slot 25 in the chamber separator is slightly larger than the exterior of the housing manifold 12 and as shown in FIGS. 5A and 5B when an assembler places the inflator held in the housing manifold into an opening 19 of the airbag 20 the ellipsoidal shaped edge of the slot 25 can be placed in the recess 15 and as the flaps 20A, 20B are pulled over the seat mounting studs 30 protruding out the backside of the housing manifold the enlarged diameter of the slot 25 is pulled into a very tight sealed fit along the front and side surfaces of the housing manifold. This happens because the holes 20C in the flaps 20A, 20B are arranged to cause a stretching of the airbag and chamber separator 22. Once assembled to the seat back 3B of the seat 3 by bolting nuts 31 onto the studs 30 the back side of the airbag 20 along the flats is sandwiched in a gas tight manner between and against the housing 12 and the seat mount thus ensuring the chamber separator 22 is sealed completely separating the first inflation chamber 24 and second inflation chamber 26. Under these circumstances, once the housing manifold 12 is secured the separator slot 25, will be securely held into the groove 17 formed by the recess 15 and seal in a gas tight manner around the surface of the recess 15 and the sides and back of the housing manifold. Upon inflation of the airbag the slot 25 will be pulled against the recess 15 in such a fashion that it cannot be released from the recess 15. In other words no matter which direction the chamber separator 22 is moving it will create a tight pull upon a large portion of the groove 17 created by the recess 15. This ensures that the slot 25 even though it is trying to move in an ellipsoidal fashion cannot be pulled away from the recess 15 in the housing manifold. As a result a gas tight seal is maintained even though the chamber separator 22 is facing a dynamic internal pressure load. This has a tremendous advantage in the assembly in that once the chamber separator 22 is properly positioned into the groove 17 created by the recess 15, it cannot become dislodged during deployment of the airbag. Testing of the airbag 20 has shown that the seal is maintained regardless of the deployment parameters due to this unique method of locking the opening 25 into the recess 15. As shown the recess 15 only needs to be formed around a portion of the circumference of the housing manifold, preferably 180 degrees or so. Alternatively, one could provide a slotted surface or split neck portion to wrap around the housing manifold and upon which a clamp or cinch could be used to tighten the chamber separator. However, this adds an additional component and is not the preferred way of providing a gas tight seal.

Figure 5C:
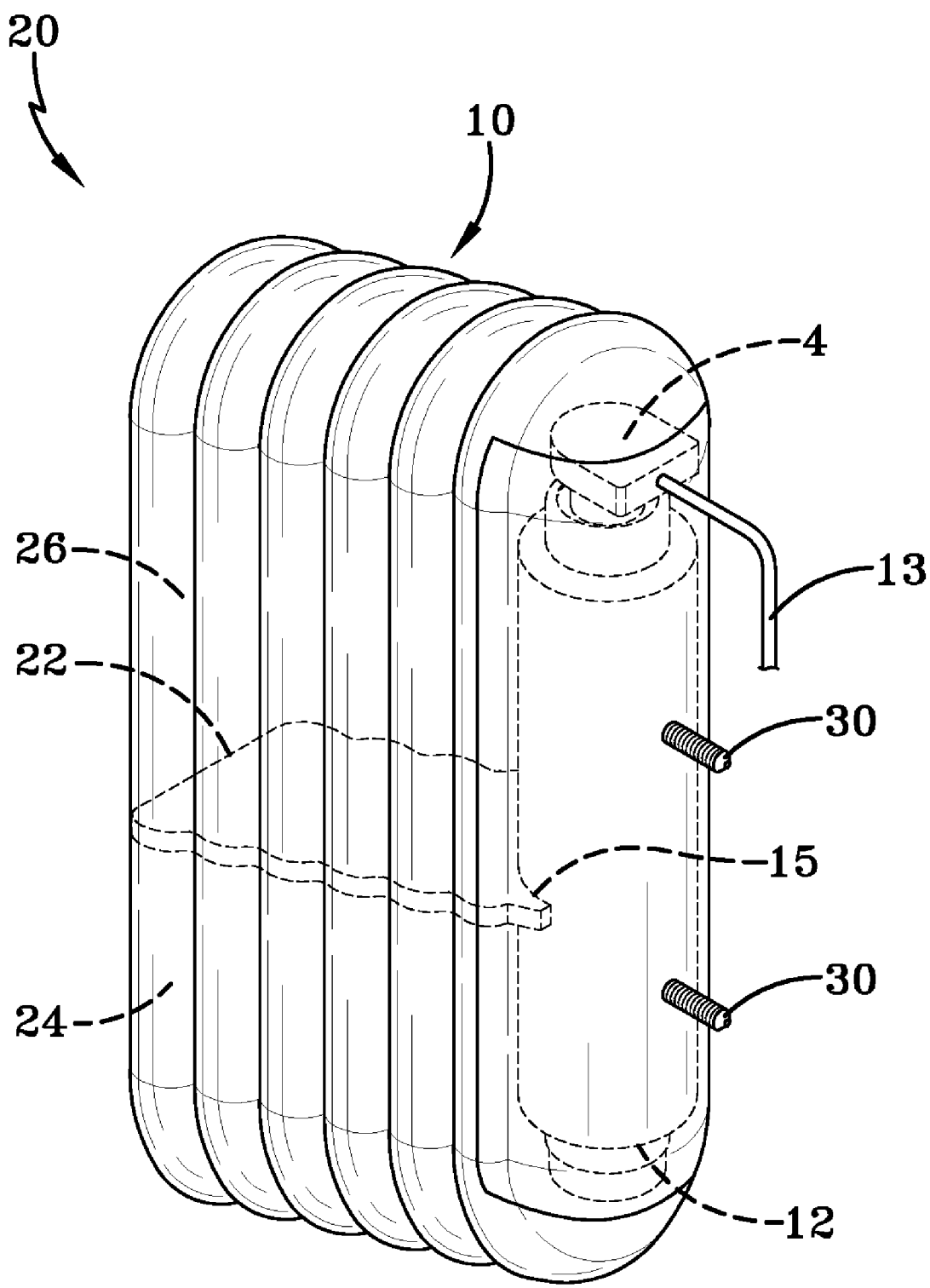
FIG. 5C shows the assembled airbag module assembly with the airbag folded prior to installation in a seat.

In FIG. 5C the airbag assembly 10 is shown with the airbag in a folded condition prior to being mounted into a seat. As shown mounting studs 30 can be provided attached to or projecting from the housing manifold 12 such that the assembly can be securely affixed to a seat bracket. Once assembled to the seat bracket the seat can then be finished with an exterior cloth surface such that the entire airbag assembly 10 is hidden from view. The cloth surface of the seat will have, as is commonly understood, a frangible area from which upon deployment of the side impact module 10 will rip open and enable the airbag 20 to deploy in such a fashion that it moves the vehicle occupant 2 away from the door and any impinging material that could cause injury.

As mentioned the apertures 14, 16 through the airbag module housing manifold 12 are provided so they are directed in the direction that the airbag 20 deploys, preferably the apertures 14, 16 extend in an area on the external surface of the housing manifold 12 less than 180 degrees around the circumference in a direction facing the deployment of the airbag. Preferably the apertures 14, 16 occupy an area less than 120 degrees around the circumference of the housing manifold to ensure that the flows of gas are directed in such a fashion to most beneficially push the airbag 20 outwardly so that it can function to protect the vehicle occupant 2.

While others have attempted to provide tunable airbags using either a two airbag system or a chamber separator without sealing the inflation chambers the present invention provides a chamber separator that is impermeable to the inflation gasses and provides a gas tight seal around the housing manifold 12 such that there is no mixture of inflation gasses 5 during deployment. This has been found uniquely desirable in that the ability to tune the airbag 20 to maintain the pressure differential essentially requires that the inflator 4, the volume of two inflation chambers 24, 26 of the airbag 20 and the apertures 14, 16 opening area must be properly sized such that the right amount of gasses 5 are generated that those gasses 5 are passed through appropriately sized apertures and that the inflation chamber volumes are such that when filled the airbag 20 in the airbag will fill at pressures required for each application. As mentioned the pressure in the first inflation chamber 24 that engages the pelvis of the vehicle occupant can be substantially higher and fill substantially quicker than the second inflation chamber 26 that engages the thoracic region of the vehicle occupant and when doing this a much safer side impact module protection for the vehicle occupant 2 is achieved.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

What is claimed is:

1. A side impact airbag module for protecting a vehicle occupant, the airbag module comprising: an airbag comprising first and second inflation chambers having different volumes separated from one another by a gas impermeable chamber separator, the airbag containing a housing manifold having at least one first aperture therethrough aligned with the first inflation chamber and at least one second aperture therethrough aligned with the second inflation chamber, the chamber separator being fixed to the housing manifold between the first and second apertures in the housing manifold in a gas tight manner; said housing manifold comprises a recess formed as a groove in the housing manifold; said chamber separator comprising an ellipsoidal cut out portion in the chamber separator to form an opening slot which is fit into said recess of the housing manifold in a gas tight manner; and wherein said slot in said chamber separator is larger than the exterior of said housing manifold recess, said housing manifold containing a single inflator that provides inflation gas to the first and second inflation chambers via the apertures in the housing manifold such that when the airbag is deployed the inflation chambers are inflated to different inflation pressures and the chamber separator prevents gas from passing between the inflation chambers.

2. The side impact airbag module of claim 1 wherein the area of the first aperture is greater than the area of the second aperture.

3. The side impact airbag module of claim 1 comprising more than one first aperture and more than one second aperture in the housing manifold, wherein the sum of the areas of the first apertures is greater than the sum of the areas of the second apertures.

4. A side impact airbag module for protecting a vehicle occupant, the airbag module comprising: an airbag having a lower first inflation chamber and an upper second inflation chamber, said lower first and said upper second inflation chambers separated by a gas impermeable chamber separator, the airbag containing an assembly comprising a single inflator fitted to an interior of a housing manifold, the housing manifold having at least one first aperture therethrough aligned with the lower first inflation chamber and at least one second aperture therethrough aligned with the upper second inflation chamber such that inflation gas exiting the inflator into the housing manifold is divided into a first flow of inflation gas that enters the lower first inflation chamber via the at least one first aperture and a second flow of inflation gas that enters the upper second inflation chamber via the at least one second aperture such that the flows of inflation gas are of different volumes causing the lower first and upper second inflation chambers to be inflated to different inflation pressures, and wherein said housing manifold comprises a recess formed as a groove in the housing manifold; and wherein said chamber separator comprising an ellipsoidal cut out portion in the chamber separator to form an opening slot which is fit into said recess of the housing manifold in a gas tight manner; and wherein said slot in said chamber separator is larger than the exterior of said housing manifold.

5. The side impact airbag module of claim 4 wherein the area of the first aperture is greater than the area of the second aperture.

6. The side impact airbag module of claim 4 comprising more than one first aperture and more than one second aperture in the housing manifold, wherein the sum of the areas of the first apertures is greater than the sum of the areas of the second apertures.

7. A seat mounted side impact airbag module for protecting a vehicle occupant, the airbag module comprising: an airbag comprising a chamber separator that defines a first inflation chamber for engaging a pelvic region of the vehicle occupant and a second inflation chamber for engaging a thoracic region of the vehicle occupant; a single inflator that provides inflation gas to the first and second inflation chambers; and a housing manifold having at least one first aperture therethrough aligned with the first inflation chamber and at least one second aperture therethrough aligned with the second inflation chamber, wherein the housing manifold is shaped to retain the inflator and direct a first flow of inflation gas into the first inflation chamber via the first aperture and a second flow of inflation gas into the second inflation chamber via the second aperture wherein the chamber separator is tightly sealed around the housing manifold to prevent the first flow of inflation gas from entering the second inflation chamber and the second flow of inflation gas to entering into the first inflation chamber, and wherein said housing manifold comprises a recess formed as a groove in the housing manifold; and wherein said chamber separator comprising an ellipsoidal cut out portion in the chamber separator to form an opening slot which is fit into said recess of the housing manifold in a gas tight manner; and wherein said slot in said chamber separator is larger than the exterior of said housing manifold.

8. The seat mounted side impact airbag module of claim 7, wherein the inflator is positioned within the housing manifold to provide a single source of inflation gas to each aperture in the housing manifold such that the first inflation chamber inflates to a higher pressure than a pressure to which the second inflation chamber is inflated.

9. The seat mounted side impact airbag module of claim 8, wherein the housing manifold is disposed within the airbag.

10. The seat mounted side impact airbag module of claim 7 wherein the first aperture is at or near a first end of the housing manifold and is directed toward the first inflation chamber direction of deployment upon activation.

11. The seat mounted side impact airbag module of claim 10 wherein the second aperture is at or near a second end of the housing manifold directed toward the second inflation chamber's direction of deployment upon activation.

12. The seat mounted side impact airbag module of claim 7 wherein the area of the first aperture is greater than the area of the second aperture.

13. The seat mounted side impact airbag module of claim 7 comprising more than one first aperture and more than one second aperture in the housing manifold, wherein the sum of the areas of the first apertures is greater than the sum of the areas of the second apertures.

14. The seat mounted side impact airbag module of claim 12 wherein the housing manifold has a circular cross section and the first and second apertures extend less than 180 degrees around a circumference of the housing manifold.

15. The seat mounted side impact airbag module of claim 13 wherein the housing manifold has a circular cross section and the first and second apertures extend less than 180 degrees around a circumference of the housing manifold.

16. The seat mounted side impact airbag module of claim 7 wherein the chamber separator comprises a silicone coated fabric.

17. The seat mounted side impact airbag module of claim 7 wherein the chamber separator is sealed in a gas tight manner against an external surface of the tubular housing manifold.

18. The seat mounted side impact airbag module of claim 7 wherein the chamber separator has a clamp to seal an opening in the chamber separator through which the tubular housing manifold extends.

* * * * *